United States Patent [19]

Yuda

[11] Patent Number: 5,070,767
[45] Date of Patent: Dec. 10, 1991

[54] COMPACT FLUID APPARATUS AND METHOD OF ASSEMBLY HAVING SEAL DEFORMING GROOVES

[76] Inventor: Lawrence Yuda, P.O. Box 176, Westminster, S.C. 29693

[21] Appl. No.: 623,251

[22] Filed: Dec. 3, 1990

Related U.S. Application Data

[63] Continuation of Ser. No. 532,104, May 30, 1990, abandoned, which is a continuation of Ser. No. 344,432, Apr. 26, 1989, abandoned, which is a continuation of Ser. No. 25,596, Mar. 13, 1987, abandoned.

[51] Int. Cl.$^5$ .......................... F01B 29/00; F01B 11/02
[52] U.S. Cl. .................................. 92/128; 92/165 R; 92/171.1
[58] Field of Search ..................... 92/128, 169.1, 171.1; 277/167.5

[56] References Cited

U.S. PATENT DOCUMENTS

| | | | |
|---|---|---|---|
| 2,453,391 | 11/1948 | Whittingham | 285/918 X |
| 3,101,984 | 8/1963 | Wieckmann | 285/918 X |
| 3,234,727 | 2/1966 | Filer | 92/169.1 X |
| 3,260,504 | 7/1966 | Mojonnier et al. | 92/94 |
| 3,334,937 | 8/1967 | Jofeh | 92/171.1 X |
| 3,494,652 | 2/1970 | Langland | 92/128 X |
| 3,650,182 | 3/1972 | Phillips | 92/128 |
| 3,667,785 | 6/1972 | Kapeker | 285/321 X |
| 4,167,134 | 9/1979 | Yuda | 92/128 X |
| 4,242,947 | 1/1981 | Renner et al. | 92/137 X |
| 4,451,069 | 5/1984 | Melone | 285/921 X |
| 4,453,698 | 6/1984 | DeFrees | 277/167.5 X |
| 4,565,506 | 1/1986 | Williams | 92/128 X |
| 4,924,758 | 5/1990 | Yuda | 92/169.1 X |

FOREIGN PATENT DOCUMENTS 543733 3/1942 United Kingdom ................ 285/321

Primary Examiner—Edward K. Look
Assistant Examiner—John Ryznic
Attorney, Agent, or Firm—Bailey & Hardaway

[57] ABSTRACT

A fluid operated apparatus having a cylinder assembly, a piston and a rod is illustrated wherein cap members are provided with a first circumferential groove and a reduced end portion while a second circumferential groove is carried opposite the first circumferential groove within the cylinder assembly forming a seat for a deformable ring. A method of assembling the fluid operated apparatus contemplates inserting an end cap into the cylinder and then mounting a deformable ring in an adjacent groove in the cylinder and then forcing the cap out so that the ring passes over a reduced end portion of the cap and is positioned in the seat formed between the opposed grooves.

3 Claims, 3 Drawing Sheets

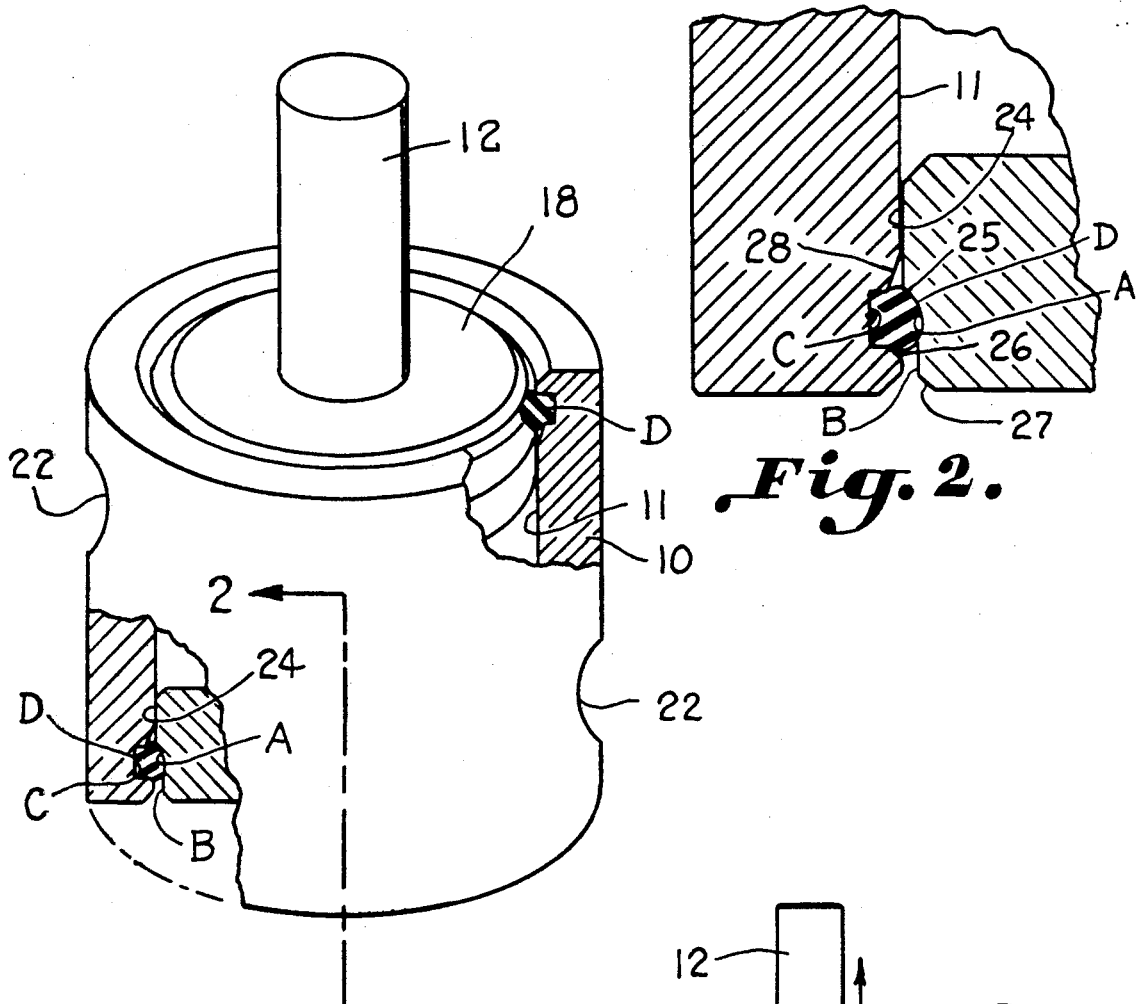
Fig. 2.
Fig. 1.
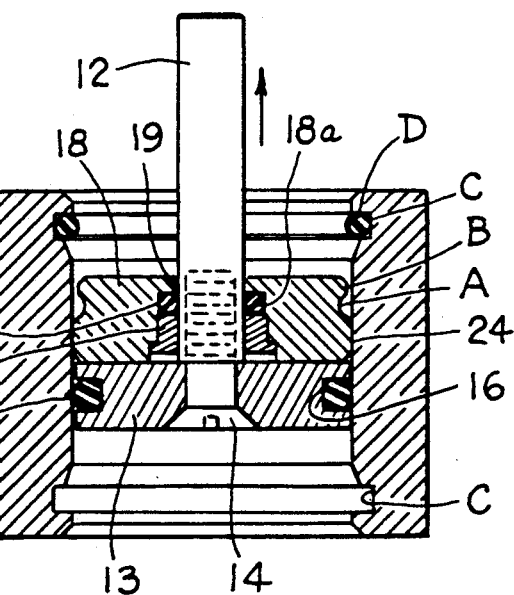
Fig. 3.

COMPACT FLUID APPARATUS AND METHOD OF ASSEMBLY HAVING SEAL DEFORMING GROOVES

This application is a continuation of application Ser. No. 07/532,104, filed May 30, 1990, which is a continuation of application Ser. No. 07/344,432, filed Apr. 26, 1989, now abandoned, which is a continuation of application Ser. No. 07/025,596, filed Mar. 13, 1987, now abandoned.

BACKGROUND OF THE INVENTION

This invention relates to compact cylinders which are useful for a variety of purposes but which may preferably be of the general type illustrated in U.S. Pat. No. 4,167,134. As is customary, the end caps of the cylinder of the patent are secured by a mechanical bond provided by a metallic ring carried within a groove in the cylinder wall and bearing against a surface of the end cap for retaining same within the cylinder walls. An O-ring constructed of deformable material is carried within a groove within the end cap and provides a fluid seal. Such cylinders are useful in connection with robotic grippers, for example, and U.S. Pat. Nos. 4,566,727 and 4,492,400 are exemplary of such constructions.

Since such end caps may often move to a limited extent axially as provided by the mechanical bond, the end cap may strike the mechanical bonding member resulting in noisy operation. Since more than one groove must be provided within the cylinder walls and end caps for accommodating the mechanical bonding member and the sealing member respectively, the grooves may not be carried opposite each other but rather must be longitudinally spaced so that a relative thickness in the area of the end caps is necessitated.

Accordingly, an important object of the present invention is the provision of a more compact cylinder wherein the end caps can be made thinner because of opposed grooves provided in the walls of the cylinder and end caps forming a seat for single deformable members which serves both to bond the end caps entirely within the cylinder walls as well as a sealing member therebetween.

Another important object of the invention is the provision of a deformable resilient bond between the end caps and the cylinder walls adjacent their ends so as to function as a sound reducing means since there is no mechanical bond as afforded by a metallic ring as would result in noisy operation but rather the resilient deformable member which serves as a sealing and a bonding member also serves to cushion sound.

SUMMARY OF THE INVENTION

It has been found that a more compact cylinder or fluid operated apparatus may be provided by utilizing opposed grooves in the cylinder walls and in the end cap members to form seats for deformable rings which act as sealing members and afford a bond or a retaining member for positioning the end cap entirely within the respective ends of the cylinder walls on either side of the piston.

The method of assembling the apparatus contemplates first inserting or sliding an end cap into one end of the cylinder and mounting or installing an O-ring or other deformable resilient ring into an adjacent groove in the cylinder wall. The cap is then forced outwardly by action of the piston when a force is exerted against the rod to cause a reduced end of the cap to pass over the deformable ring so that the ring becomes seated between opposed grooves in the cap and in the cylinder wall respectively. An enlarged shoulder is carried by the cap member which prevents further outward movement of the end cap so that the end cap is retained and confined entirely within the cylinder walls and a seal is provided between the cap and the cylinder walls.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a compact fluid operated apparatus with parts broken away for illustrating the structure for retaining the end caps while at the same time providing a seal in accordance with the invention, FIG. 2 is an enlarged transverse sectional elevation taken on the line 2—2 in FIG. 1, FIG. 3 is a sectional elevation at a reduced scale illustrating a first step in the installation of a resilient deformable ring to position one of the end caps in accordance with the method of the invention.

DESCRIPTION OF A PREFERRED EMBODIMENT

Figure 4:
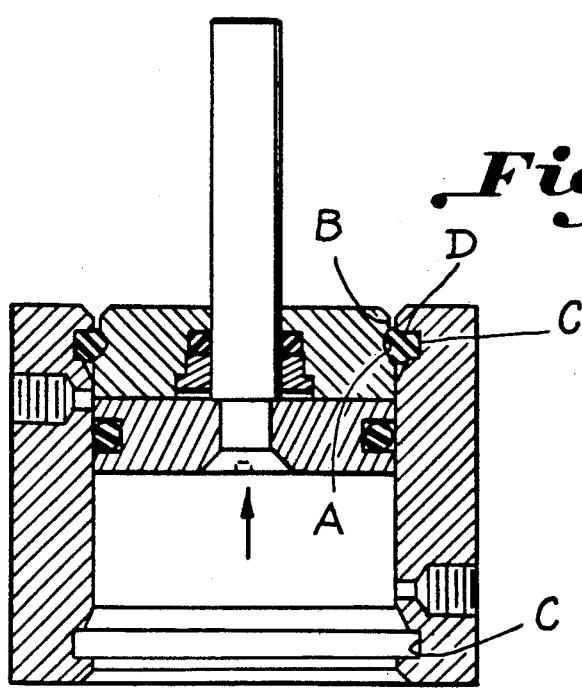
FIG. 4 is a sectional elevation illustrating a next step in the assembly of the apparatus wherein the end cap is forced by the cylinder over the deformable ring at a reduced end seating the deformable ring in the area between the opposed grooves which forms a seat for the ring.
Figure 5:
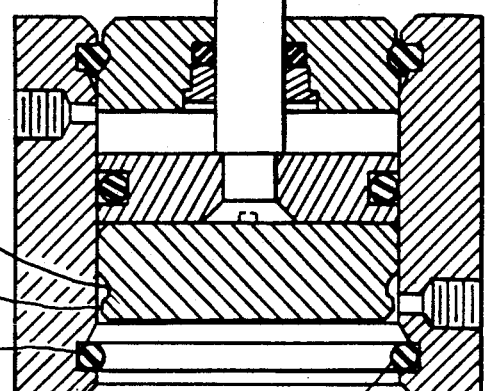
FIG. 5 is a sectional elevation similar to FIG. 3 wherein a second end cap has been inserted and a resilient deformable ring mounted in a groove adjacent the end of the cylinder walls.
Figure 6:
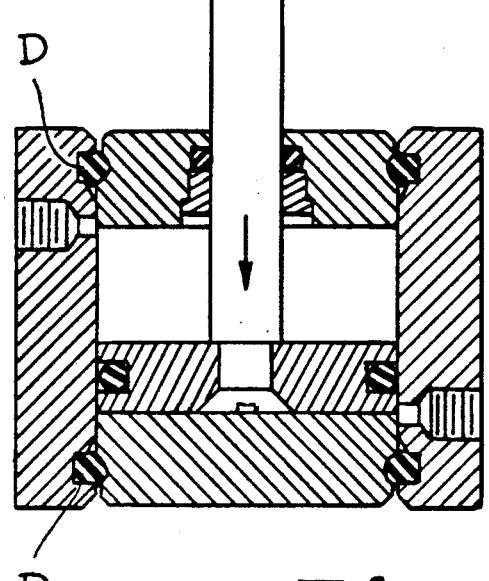
FIG. 6 is a sectional elevation similar to FIG. 4 showing the final step in forcing the other cap outwardly to seat the deformable ring.

A fluid operated apparatus having a cylinder assembly, a piston and a rod carried thereby is illustrated. Cap members located entirely within the cylinder assembly are carried on at least one side of the piston having a first circumferential groove A, and a reduced end portion B extending from the groove to an outer end of the cap member having a lesser diameter than the diameter of the cap above the first circumferential groove. A second circumferential groove C is carried within the cylinder assembly adjacent at least one end thereof opposite the first circumferential groove. A deformable ring D is carried within a space defined between the first and second circumferential grooves in a compressed deformed state. The opposing beveled retaining edges in the first and second circumferential grooves work to deform the deformable ring D when in sealing relation. A beveled surface is also provided at an outer edge of the cap. Thus, a fluid seal is provided between a cylinder assembly and a cap member while the cap member is retained entirely within one of the cylinder walls the cylinder.

The method of assembling such an apparatus contemplates inserting one of the end caps into the cylinder past one of the grooves in the cylinder assembly on one side of the piston. A deformable sealing ring is mounted in said one of said grooves, and the reduced end portion of the cap is forced past the sealing ring until the sealing ring seats in opposed annular grooves. The other of the end caps is inserted into the cylinder past the other of the grooves in the cylinder on the other side of the piston. A deformable sealing ring is mounted in the other of the grooves, and a reduced end portion of the cap is forced past the sealing ring until the sealing ring seats in opposed annular grooves.

Referring more particularly to FIG. 1, a fluid operated apparatus or air cylinder and the like is illustrated as having a cylinder assembly 10 provided with inner walls 11. A piston rod 12 is connected to a piston 13, FIGS. 3-6. The rod 12 is connected to the piston as by a threaded bolt 14 which is threadably received within the piston rod. A sealing member is provided in the form of an O-ring 15 carried within a groove 16 in the piston. Sealing means are provided by an O-ring 17 carried within a groove 18a within a cap 18 which provides an opening 19 for slideably receiving the rod 12. A retaining member 20 is provided for seating the O-ring.

It will be observed that fluid ports 22 are provided adjacent each end of the cylinder 10. The cap members are each provided with an annular groove A which joins a reduced end portion B. Thus, an enlarged shoulder 24 is formed on the inner end of the respective end caps. An annular groove C is provided in the respective ends of the cylinder walls 11 for accommodating a resilient deformable member such as the O-ring D which may be constructed as of the usual rubbery material. A tapering surface 28 is provided to facilitate positioning of the deformable ring D within the grove C. The opposed retaining marginal portions of the respective grooves illustrated at 25 and 26 are formed by bevelling the respective edges of said grooves, and a bevel 27 is provided at an outer edge of the cap.

Figure 7:
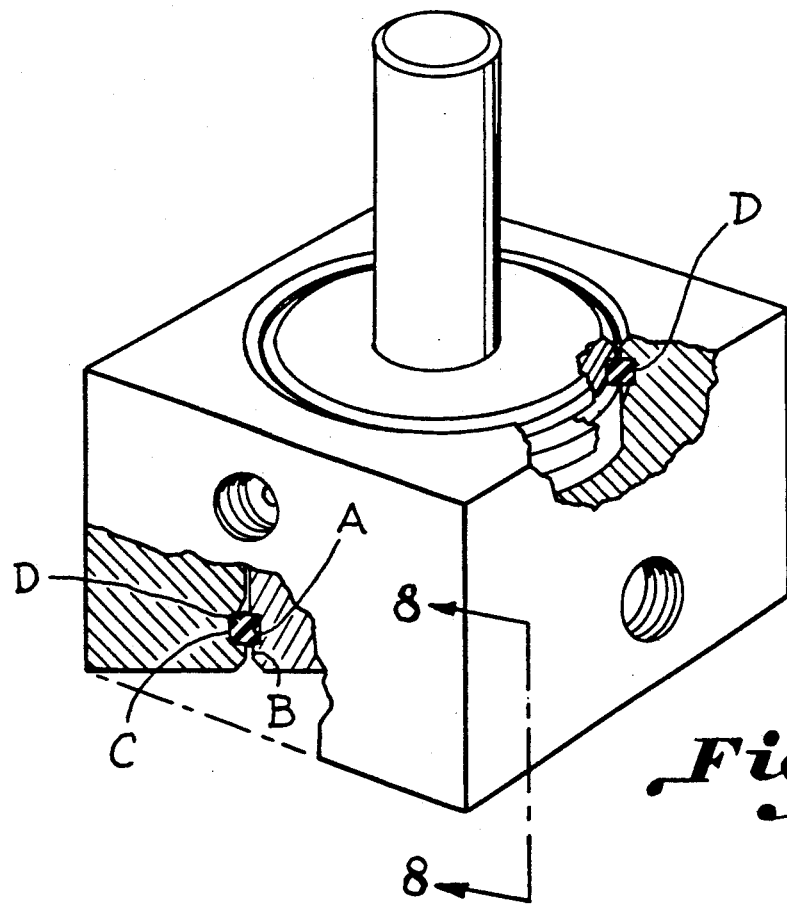
FIG. 7 is a perspective view illustrating a modified form of the invention wherein the cylinder housing is square and the deformable ring of a rectangular or square configuration having flats.
Figure 8:
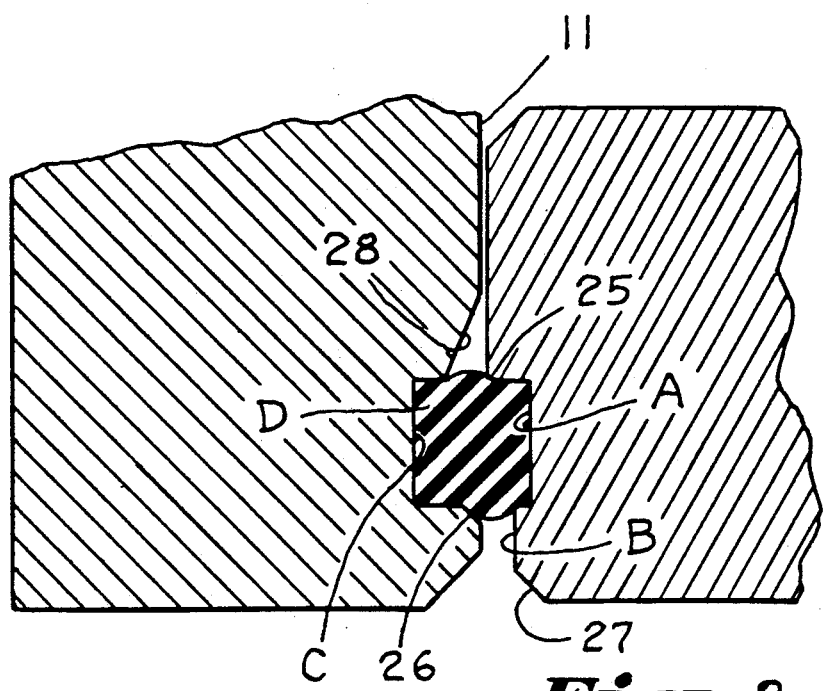
FIG. 8 is an enlarged sectional elevation taken on the line 8—8 in FIG. 7 illustrating the deformable ring and associated groove and cap constructions.

FIGS. 7 and 8 illustrate a modified form of the invention wherein a square cylinder is utilized and a square deformable ring D is illustrated. FIG. 8 shows a deformation of the ring against a force tending to dislodge the end cap outwardly. That is, a source of fluid under pressure within the cylinder assembly can exert a force which will urge the cap outward. As in the first embodiment a tapering surface 28 is provided to facilitate positioning of the deformable ring D within the groove C. A beveled surface is illustrated at 27 at an outer edge of the cap while opposed marginal portions 25 and 26 are carried at opposite edges of the grooves A and C respectively.

While a preferred embodiment of the invention has been described using specific terms, such description is for illustrative purposes only, and it is to be understood that changes and variations may be made without departing from the spirit or scope of the following claims.

What is claimed is:

1. A fluid operated apparatus having a cylinder assembly, a piston and a rod carried thereby comprising:

a cap member carried within said cylinder assembly on at least one side of said piston and being confined entirely within a wall of said cylinder assembly including;
 a first circumferential groove in said cap member; and
 a reduced end portion extending from said groove to an outer end of said cap member having a lesser diameter than the diameter of said cap above said first circumferential groove;
 a source of fluid under pressure within said cylinder assembly exerting a force urging said cap outwardly;
 a second circumferential groove within said cylinder assembly adjacent at least one end thereof opposite said first circumferential groove of said cap member;
 a deformable ring carried within a space defined between said first and second circumferential grooves in a compressed deformed state for positioning said cap member within said cylinder assembly and providing a fluid seal between the cylinder assembly and the cap member; and
 opposed retaining marginal portions in said first and second circumferential grooves deforming said ring when in sealing relation and before application of said force by said source of fluid under pressure to said cap member, said marginal portions retaining said cap member within said cylinder;
 whereby a compact cap member and a correspondingly compact apparatus is provided as the single deformable ring serves both to position the end cap and to provide a fluid seal.

2. The method of assembling a compact fluid operated apparatus having a cylinder assembly having annular grooves adjacent each end thereof, end caps being confined entirely within a wall of said cylinder assembly, each end cap having a single annular groove therein, said grooves of said cylinder and said grooves of said end caps having opposed retaining marginal portions, a source of fluid under pressure within said cylinder assembly exerting a force urging said cap outwardly, and a piston and a rod carried thereby comprising the steps of:

inserting one of said end caps into said cylinder past one of said grooves in said cylinder assembly on one side of said piston;
 mounting a deformable sealing ring in said one of said grooves;
 forcing a reduced end portion of said one of said end caps between an outside edge and said annular groove therein past said sealing ring until said sealing ring seats in opposite annular grooves and is retained and deformed by said opposed retaining marginal portions before application of force by said source of fluid under pressure to said one of said end caps, positioning said one of said end caps within the cylinder and providing a fluid seal between the cylinder assembly and the cap member;
 inserting the other of said end caps into said cylinder past the other of said grooves in said cylinder on the other side of said piston;
 mounting a deformable sealing ring in said other of said grooves; and
 forcing a reduced end portion of said other of said end caps between an outside edge and said annular groove therein past said sealing ring until said sealing ring seats in opposite annular grooves and is retained and deformed by said opposed retaining marginal portions before application of force by said source of fluid under pressure to said other of said end caps, positioning said other of said end caps within the cylinder and providing a fluid seal between the cylinder assembly and the other of said end caps.

3. The structure set forth in claim 1 wherein said opposed retaining marginal portions are beveled.

* * * * *